United States Patent [19]

Porel

[11] Patent Number: 4,964,345
[45] Date of Patent: Oct. 23, 1990

[54] RAIL CAR AXLE WITH AXIAL HYDRAULIC PUMP

[75] Inventor: Louis C. Porel, Rambervillers, France

[73] Assignee: Hydro Rene Leduc, Baccarat, France

[21] Appl. No.: 281,532

[22] Filed: Dec. 8, 1988

[30] Foreign Application Priority Data

Dec. 18, 1987 [FR] France .................................. 87 17727

[51] Int. Cl.$^5$ ..................... B61D 43/00; B60K 25/08; F04B 1/00; F04B 9/02
[52] U.S. Cl. ..................................... 105/96.1; 105/96.2
[58] Field of Search .............................. 105/96.1, 96.2; 295/36.1, 43; 180/305, 306, 307, 308; 91/485, 491; 60/485; 417/270, 510, 515, 273, 271, 319, 269

[56] References Cited

U.S. PATENT DOCUMENTS

| | | | |
|---|---|---|---|
| 2,405,193 | 8/1946 | Dean .................................. | 105/96.1 |
| 2,422,946 | 6/1947 | Brittain, Jr. ..................... | 105/96.1 X |
| 2,903,973 | 9/1959 | Lewis ................................. | 105/96.1 |
| 2,910,013 | 10/1959 | Murphy ............................. | 105/96.1 |
| 3,280,934 | 10/1966 | De Biasi ........................... | 105/96.2 X |
| 4,377,975 | 3/1983 | Scott et al. ....................... | 105/96.1 |

Primary Examiner—Douglas C. Butler
Attorney, Agent, or Firm—Darby & Darby

[57] ABSTRACT

A rail car axle (1) carries on one of its ends a hydraulic pump (10) for energizing auxiliary devices. This pump has several pistons (11) driven by a wobble plate (12) carried on the end of a shaft (13). The car axle (1) is supported by bearings (2) placed inside a housing (3) and held in place by a cover (3a) attached to the axle end by bolts (4). The axle (1) is fastened to its undercarriage by an adaptor piece (48) attached to the housing (3). The body (16) of pump (10) is made of two parts, the first one comprising the bores (15) receiving the pistons (11) with the check valves (17) and the outlet (18), while the second part comprises the inlet (19) which opens into the chamber (20) inside which revolves the wobble plate (12). According to this invention, the second part of the pump body (16) comprises a central element (40) having a central bore containing the bearings (21) for the wobble plate shaft (13). Shaft (13) is splined and engages a splined sleeve (41) integral with a flange (29) held by a spring (42) against the cover (3a) of the axle bearings (2), so as to be driven by the bolts (4). This second part of the pump body (16) further comprises a skirt (43) around the central element (40). This skirt carries lugs (44) for firmly fastening the pump body (16) to the adaptor piece (48) which connects the axle (1) with its undercarriage. The lugs (44) are fastened to the adaptor piece (48) by bolts (47) passing through spacer sleeves (45).

7 Claims, 1 Drawing Sheet

RAIL CAR AXLE WITH AXIAL HYDRAULIC PUMP

This invention relates to a rail car axle provided on at least one of its ends with a hydraulic pump.

BACKGROUND OF THE INVENTION

It is known how to drive auxiliary devices such as e.g. electric generators from a rail car axle by means of a belt running over a driving pulley keyed on the car axle and over a smaller driven pulley keyed on the shaft of the electric generator. However, when having to drive a hydraulic pump which is intended for energizing hydraulic servo-drives such as those for actuating doors, this kind of transmission is complicated and expensive, and it cannot be supplied to an user under a form which could readily be assembled by the user. It is also possible to provide a driving system using bevel gears on the end of the axle, for driving a transmission shaft having universal joints, this shaft being further connected to the pump shaft; however, this kind of transmission is also costly and comprises too many mechanical parts, each one of which is subject to breakdowns.

On another hand, the regulatory authorities of railways prescribe that axles must not be subjected to any axial stress which could be liable to cause a shift, however small, of the axle along its axis.

In an attempt to solve this problem, French Pat. No. 86.00480 describes a rail car axle provided on at least one of its ends with a hydraulic pump, characterized in that the hydraulic pump is a slanted-plate pump having its axis coaxial to the said axle; said slanted plate driving a plurality of pistons parallel to the axis of the car axle and located within a pump body provided with a cylindrical skirt inside which is placed the slanted plate, said skirt carrying the bearings which support the slanted plate and its shaft, and comprising the means for fastening the pump on the hub cap of the axle.

According to this prior patent, the linkage between said axle and the pump drive shaft is achieved by means of a connecting member formed of a plate and a shaft, said plate being biased by a spring so that it will rest against the end of the axle, while said shaft is rotatably linked with the pump shaft while remaining free to slide axially relatively thereto.

Again according to this prior patent, the pump skirt is fastened either directly onto the hub cap of the axle, by screwing it inside the central hole of the hub cap as it extends through said hole, or else by means of a support member fastened to the hub cap, externally thereto.

However, the fact is to be taken into account that in several countries, including the U.S.A., rail car axles are not provided with hub caps, so that the pump fastening system described in the above-mentioned French Pat. No. 86.00480 is not applicable.

In the U.S.A., the linkage between the roller bearing housing located on the end of an axle and the undercarriage frame is effected by means of an adaptor piece.

SUMMARY OF THE INVENTION

According to this invention, the portion of the pump body carrying the roller bearings which support the shaft of the slanted plate and the plate itself is connected by two lugs with two sleeves intended for receiving two threaded bolts which are screwed into the above-said adaptor piece.

It will then become possible to fasten the above described hydraulic pump to the axle end.

As an example of an embodiment of this invention, the appended drawings are illustrating:

FIG. 1, a lateral elevation view, partly cut out along line A—A of FIG. 2, of a rail car axle of a type in use in the U.S.A.;

FIG. 2, an end view, partly cut out along line B—B of FIG. 1;

FIG. 3, an end view, partly cut out along line C—C of FIG. 1.

DETAILED DESCRIPTION OF THE INVENTION

Figure 1:
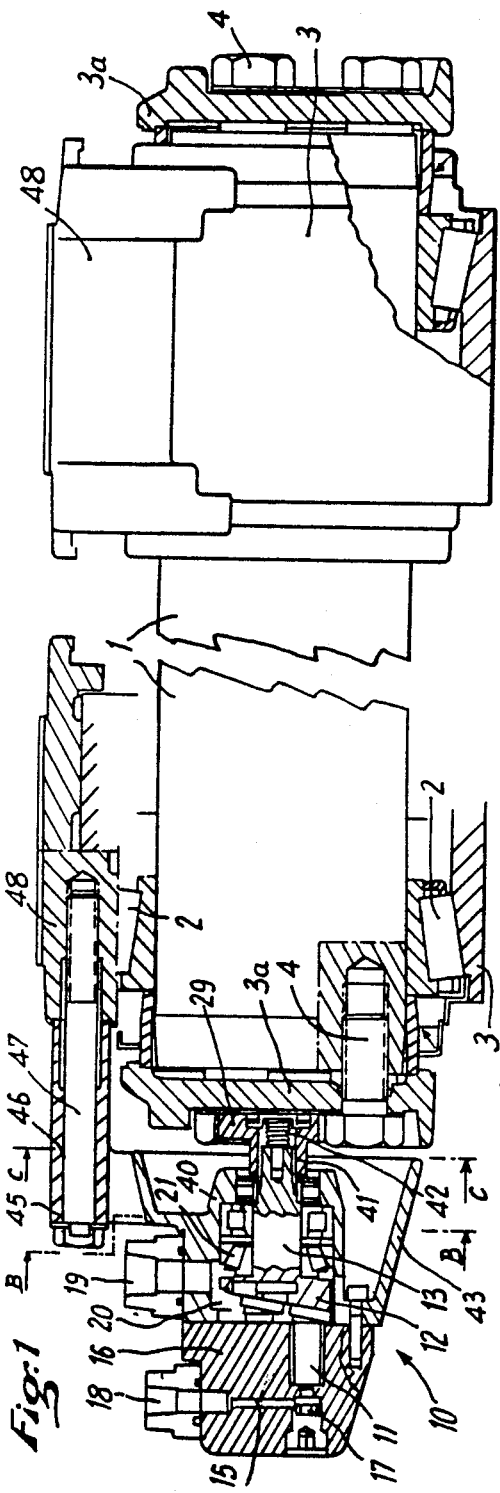

Referring to these Figures, it will be seen that the axle 1 of a rail car (not shown) is supported by one or several bearings 2 which are arranged inside a housing 3 which is itself held in place by a cover 3a fastened to the end of the axle by three bolts 4 spaced apart at 120° from each other.

On the end of said axle is disposed a hydraulic pump 10 which is a piston pump, so that it may provide a significant hydraulic pressure, even at a slow speed, which is not the case with rotary pumps or gear pumps.

Preferably, the pump is of the axial piston type, i.e. comprising a plurality of pistons 11, the axes of which are parallel to the pump axis, these pistons being driven for reciprocating by means of a slanted plate 12 driven in rotation by a drive shaft 13.

As already described in several earlier patents filed by the same Applicant, the pistons 11 are hollow and they are provided with spherical heads which bear through sliding pads against the slanting face of the slanted plate 12. This face of the slanted plate 12 is provided with a crescent-shaped opening for allowing hydraulic fluid to flow inside each hollow piston, at the moment when the sliding pad of said piston passes over the crescent-shaped opening. As already described in Applicant's French Pat. No. 77.17844, the crescent-shaped opening 14 extends symmetrically on both sides of the lowermost point of the maximum slanting line xy of the slanted face of the slanted plate 12. This arrangement allows the pump to operate irrespective of the rotating direction of shaft 13.

As can be seen from FIG. 1, the pump body 16 is in two parts, a first part comprising the bores 15 in which pistons 11 reciprocate, the check valves 17, and the outflow orifice 18, while the second part comprises the inlet 19 which opens into the chamber 20 inside which revolves the slanted plate 12.

According to the present invention, this second part of the pump body comprises a central element 40 inside which is formed a central bore carrying the bearings 21 which support the shaft 13 of the slanted plate. The other end of shaft 13 is splined and is inserted into a sleeve 41 provided with matching splines, said sleeve 41 being integral with a flange 29 which is held by a spring 42 against the lid 3a of the housing 3 of the bearings 2 of axle 1. The flange 29 is formed with a plurality of notches 32 for receiving respectively the bolts 4 which fasten the lid 3a of the housing of the axle bearings to this housing 3.

The second part of the pump body further comprises a member 43 having a substantially frusto-conical shape, which surrounds the above-described central element 40. This member 43 comprises, on its upper side, two lugs 44 arranged obliquely, each lug being assembled with a sleeve 45 provided with a cylindrical bore 46 inside which is inserted a bolt 47, the threaded end of which is screwed inside a mating thread formed inside the adaptor piece 48. As it will be more clearly seen on the right-hand side of FIG. 1, the adaptor piece 48 is the connecting piece for assembling the car axle 1 with the undercarriage frame (not shown). This adaptor piece 48 rests on the housing 3 of the bearings 2, the blocking cover 3a of this housing 3 being fastened to the axle 1 by means of bolts 4.

Figure 3:
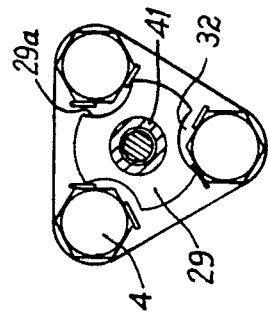

Referring now to FIG. 3, it will be seen that the flange 29 carrying the splined sleeve 41 presents three notches 29a for receiving the heads of the bolts 4; as a result, when the axle 1 rotates, it drives the flange 29, causing it to rotate so that in turn it drives the shaft 13 through its splined sleeve 41.

The frusto-conical member 43 is attached to the adaptor piece 48 by means of an attaching arrangement 60 or means having two sleeves 45; since this adaptor piece is itself assembled with the central element 40 which carries the pump body 16 on the one hand, and the shaft 13 as well as the slanted plate 12 on the other hand, the hydraulic pump is entirely and firmly supported by the adaptor piece 48.

It will therefore be sufficient to form two threaded bores into the adaptor piece 48 for installing the hydraulic pump on the axle.

A body of the pump 10 including the frusto-conical member 43 is attached to the adaptor piece 48 and to the undercarriage frame in such a manner that the entire weight of the pump and stresses developed during its operation are absorbed by the attaching arrangement and do not affect rotation of the axle and operation of the pump.

Figure 2:
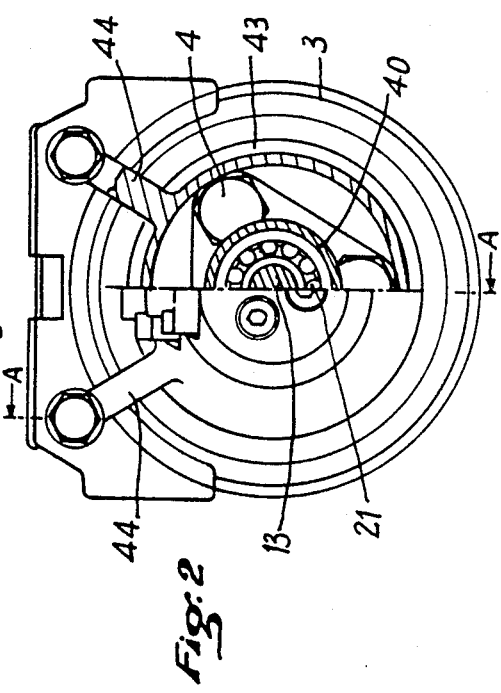

It is shown in FIGS. 1 and 2 that the attaching arrangement 60 is located within an upper part of the pump. The pump 10 extends downwardly from the attaching arrangement without any additional support. Such position of the pump enables among other advantages to maintain a gap between the pump and the engaging part of the axle. The gap may be used for inspection and lubrication purpose.

I claim:

1. A rail car axle arrangement comprising
   at least one axle of said rail car having an end engaging portion being rotated within a first bearing means, said bearing means being supported by a frame of said rail car;
   an independent pump means having a body being energized during rotation of said end engaging portion of the axle;
   said body of the pump means being attached to said frame of the car through attaching means in such a manner that the entire weight of the pump means and stresses developed during its operation are absorbed by said attaching means and do not affect rotation of the axle.

2. A rail car axle arrangement according to claim 1, wherein said attaching means is located within an upper part of the body of said pump means so that the pump means extends downwardly from said attaching means without any additional support and a gap exists between said pump means and said end engaging portion of the axle during operation of said arrangement.

3. A rail car axle arrangement according to claim 2, wherein said attaching means comprises two wall portions positioned within the body of the pump means, each said wall portion having at least one aperture going therethrough, said apertures being adapted to receive fixing means for fixing said pump means to the frame of the rail car.

4. A rail car axle arrangement according to claim 3, wherein said two wall portions are disposed to each other at a predetermined angle and said fixing element is a threaded element being threaded into an opening located in the frame of the rail car.

5. A rail car axle arrangement according to claim 1, wherein said pump means is connected to said frame through the adapter.

6. A rail car axle arrangement according to claim 2, wherein said pump means is a hydraulic pump having axial pistons driven by a slanted plate, a shaft of the plate being coaxial with and connected to said end engaging portion of the axle, said shaft of the plate being rotationally supported by a second bearing means positioned with the body of the hydraulic pump;
   wherein said hydraulic pump being attached to the frame by the attaching means in such a manner that the shaft of the plate, axle of the rail car and second bearing means are substantially relieved from bending stresses resulted from the weight of the pump acting on said shaft, axle and second bearing means.

7. A rail car axle arrangement comprising a hydraulic pump having a plurality of axial pistons driven by a slanted plate, a shaft of said plate being coaxial with the axle of rail car, said pump having first and second parts; said first part comprising pistons, a check valve and a discharge outlet; said second part comprising said slanted plate, a fluid inlet and a central element carrying bearings for the shaft of the slanted plate, said central element being integral with a support member which is attached by means attaching means having an adaptor piece forming the connection between said axle and its undercarriage frame;
   whereby the entire weight of the hydraulic pump and stresses developed during its operation are absorbed by said attaching means and do not affect operation of the axle arrangement.

* * * * *